(12) United States Patent
Rude et al.

(10) Patent No.: US 6,513,197 B2
(45) Date of Patent: Feb. 4, 2003

(54) FRICTION HINGE WITH POP-UP FEATURE

(75) Inventors: Edward T. Rude, Columbia, MD (US); Yury Karfiol, Brooklyn, NY (US)

(73) Assignee: Torqmaster, Inc., Stamford, CT (US)

( * ) Notice: Subject to any disclaimer, the term of this patent is extended or adjusted under 35 U.S.C. 154(b) by 0 days.

(21) Appl. No.: 09/838,485

(22) Filed: Apr. 19, 2001

(65) Prior Publication Data

US 2002/0059690 A1 May 23, 2002

Related U.S. Application Data

(60) Provisional application No. 60/252,769, filed on Nov. 22, 2000.

(51) Int. Cl.⁷ .............................................. E05D 11/08
(52) U.S. Cl. ........................... 16/342; 16/341; 361/681; 361/683
(58) Field of Search .......................... 16/319, 337, 341, 16/342; 361/616, 617, 610, 681–686

(56) References Cited

U.S. PATENT DOCUMENTS

| | | | | |
|---|---|---|---|---|
| 5,037,231 A | | 8/1991 | Kiramura .................... 403/120 |
| 5,231,734 A | | 8/1993 | Rude ............................ 16/342 |
| 5,406,678 A | * | 4/1995 | Rude et al. .................... 16/342 |
| 5,566,048 A | | 10/1996 | Esterberg et al. ........... 361/681 |
| 5,771,539 A | | 6/1998 | Wahlstedt et al. ............ 16/285 |
| 5,771,540 A | | 6/1998 | Carpenter et al. ............ 16/308 |
| 5,887,317 A | * | 3/1999 | Baker ........................... 16/273 |
| 6,163,452 A | * | 12/2000 | O'Neal et al. ........... 312/223.1 |
| 6,230,365 B1 | | 6/2001 | Lu ................................ 16/342 |
| 6,266,236 B1 | * | 7/2001 | Ku et al. .................... 361/681 |
| 6,317,928 B1 | * | 11/2001 | Guillemette ................. 16/353 |

* cited by examiner

*Primary Examiner*—Thomas B. Will
*Assistant Examiner*—Tara L. Mayo
(74) *Attorney, Agent, or Firm*—Gottlieb, Rackman & Reisman, P.C.

(57) ABSTRACT

A friction hinge comprising a shaft and a band including a spring portion which is rotatable relative to the shaft and wrapped tightly about the shaft for providing frictional torque between the shaft and spring portion is provided. The shaft includes a contact member for engaging the spring portion when the spring portion is rotated in one of two rotational directions and reaches a selected rotational position with respect to the shaft. Further rotation of the shaft in that direction causes the spring portion to loosen about the shaft.

20 Claims, 11 Drawing Sheets

FRICTION HINGE WITH POP-UP FEATURE

This application claims the benefit of No. 60/252,769, filed Nov. 22, 2000.

BACKGROUND TO THE INVENTION

Friction hinges are used for mounting lids onto laptop computers and for other devices having lid mounted displays that require accurate position control for satisfactory viewing. In such devices, it is often desirable that the lid lift slightly upon releasing of the latch that is used to keep the lid closed when the device is to be moved. This feature, or capability has become known to those in the laptop computer industry as a "pop-up" action. Pop-up action has been accomplished in some prior art devices by the inclusion of cam mechanisms or spring detent mechanisms. But the addition of any hardware into a laptop is undesirable because of the stringent constraints on size, weight and cost.

SUMMARY OF THE INVENTION

Our invention achieves the pop-up action by the innovative modification of hardware elements that are already present in devices having rotatable displays that require accurate positioning for good viewing. Friction hinges are ordinarily used both to attach the display to the base and to maintain the position of the display during use. Our invention uses the same springs both to produce the friction and the force needed for the pop-up action. An additional benefit of our invention is that, as the pop-up action takes place, the frictional torque is greatly reduced, thereby facilitating the pop-up motion.

Quite commonly, designers and manufacturers of devices having displays wish to provide a stop mechanism within the friction hinges. Our invention provides such a stop by means of a pin or protrusion as is well known in the prior art. Our innovation is to use this configuration in a novel manner to also provide the desirable pop-up action without any additional parts.

In the preferred embodiments, a friction hinge made with a question-mark-shaped band wrapped about a cylindrical shaft has a stop pin or other protrusion fixedly mounted to the cylindrical shaft and perpendicular to its axis. Slightly before the display reaches the fully closed position, the pin or protrusion contacts the end of the cylindrical portion of the band. The further motion traversed in fully closing the lid presses the pin or protrusion against the band causing the band to spring open a small amount and to be held there by the latch mechanism or other means provided to keep the lid fully closed. When next the latch is released to open the lid, the spring force of the band pushing against the pin or protrusion causes the lid to pop up enough to permit the user easily to grasp the lid and position it for use.

It is an objective of our invention to provide a friction hinge for mounting of displays to laptop computers and other devices which also provides a pop-up action upon releasing of a latch mechanism.

It is a further objective of our invention to provide such a friction hinge with pop-up action which can be manufactured and sold at no additional cost as compared with the cost of prior art frictional hinges containing a stop pin.

The inventive pop-up friction hinge accordingly comprises the features of construction, combination of elements, and arrangement of parts which will be exemplified in the constructions described hereinafter, and the scope of the invention will be indicated in the claims.

DESCRIPTION OF THE DRAWINGS

FIG. 7(*b*) is a cross-sectional view of that shaft;

DETAILED DESCRIPTION OF THE DRAWINGS

Figure 1:
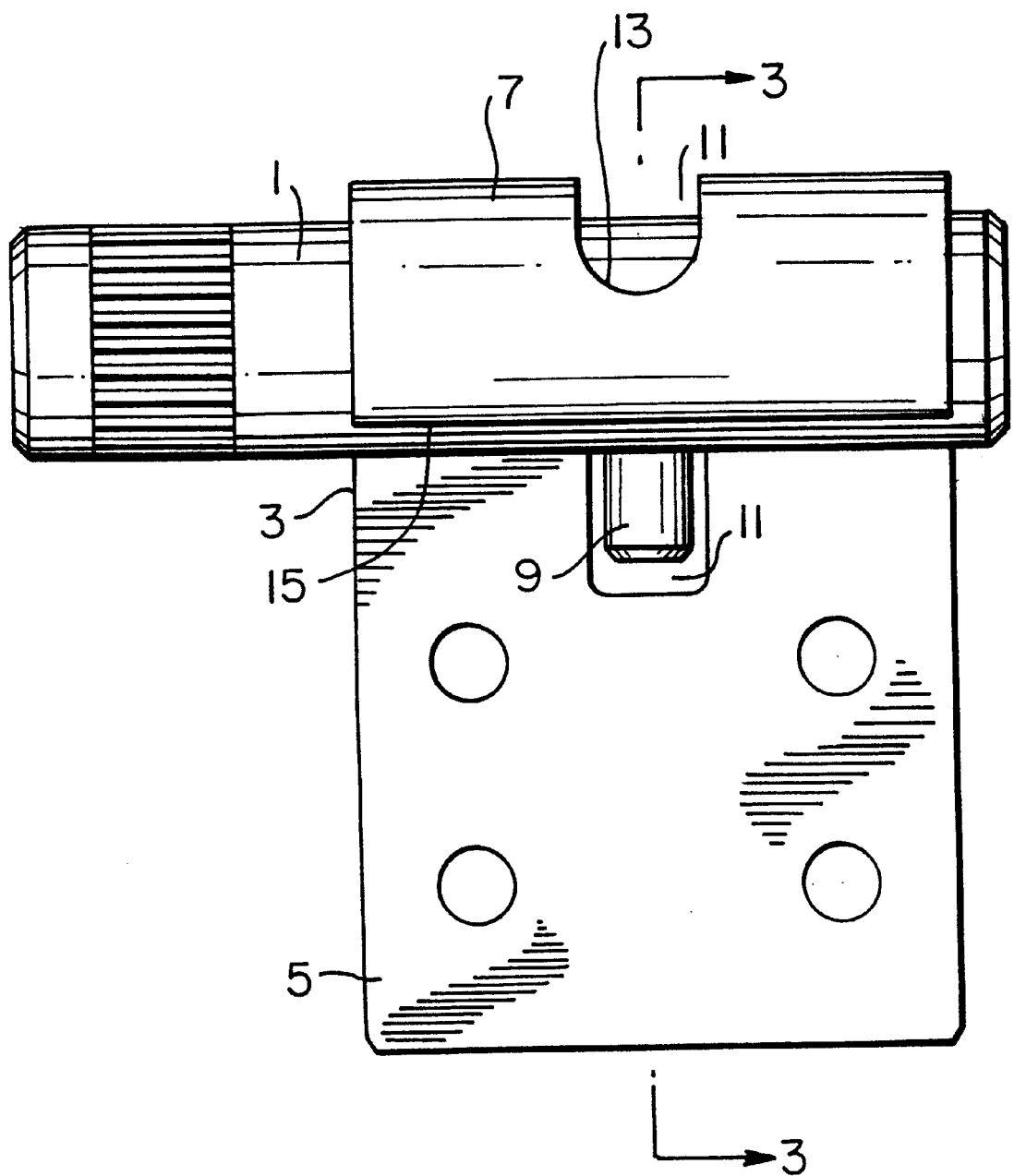
FIG. 1 is a front elevational view of the preferred embodiment of the hinge of the invention.

Referring to FIG. 1, the friction hinge is comprised of a cylindrical shaft 1, about which is disposed a band 3, which has been formed into the familiar question-mark like shape. In a typical installation, shaft 1 would be attached to the display portion of a device and band 3 would be mounted to the base portion. Whereas the mounting is often done as described, nothing prevents the shaft from being mounted to the base, and the band to the display or lid portion, and all of the operational benefits of the invention will still be realized. Band 3 has tail portion 5, which can be configured in any convenient manner suitable for mounting to the device.

Figure 2:
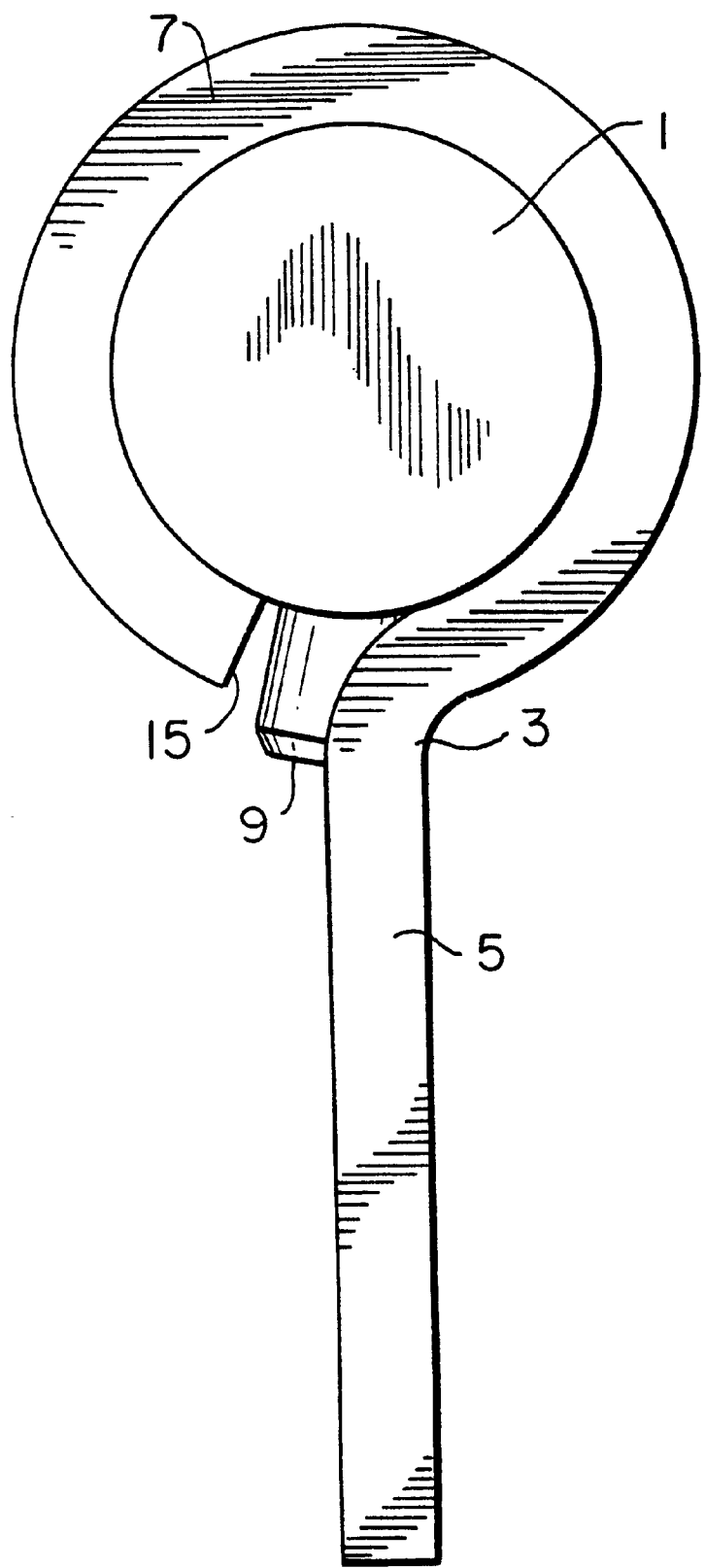
FIG. 2 is an end view of the same, preferred embodiment of the hinge of the invention.

As is well known to those skilled in the art of friction hinges, band 3 must be made of a spring material, properly hardened and tempered, and the friction-producing portion of the band must be formed into a nearly-circular shape 7, as best seen in FIG. 2. Importantly, band 3 has a diameter, before being fitted over shaft 1, that is slightly smaller than the outside diameter of shaft 1. Stress is produced in circular portion 7 of band 3 as it is expanded to fit onto shaft 1. This stress causes friction between shaft 1 and band 3 when they are rotated with respect to one another. This friction maintains the position of the lid of the computer when in use.

Figure 3:
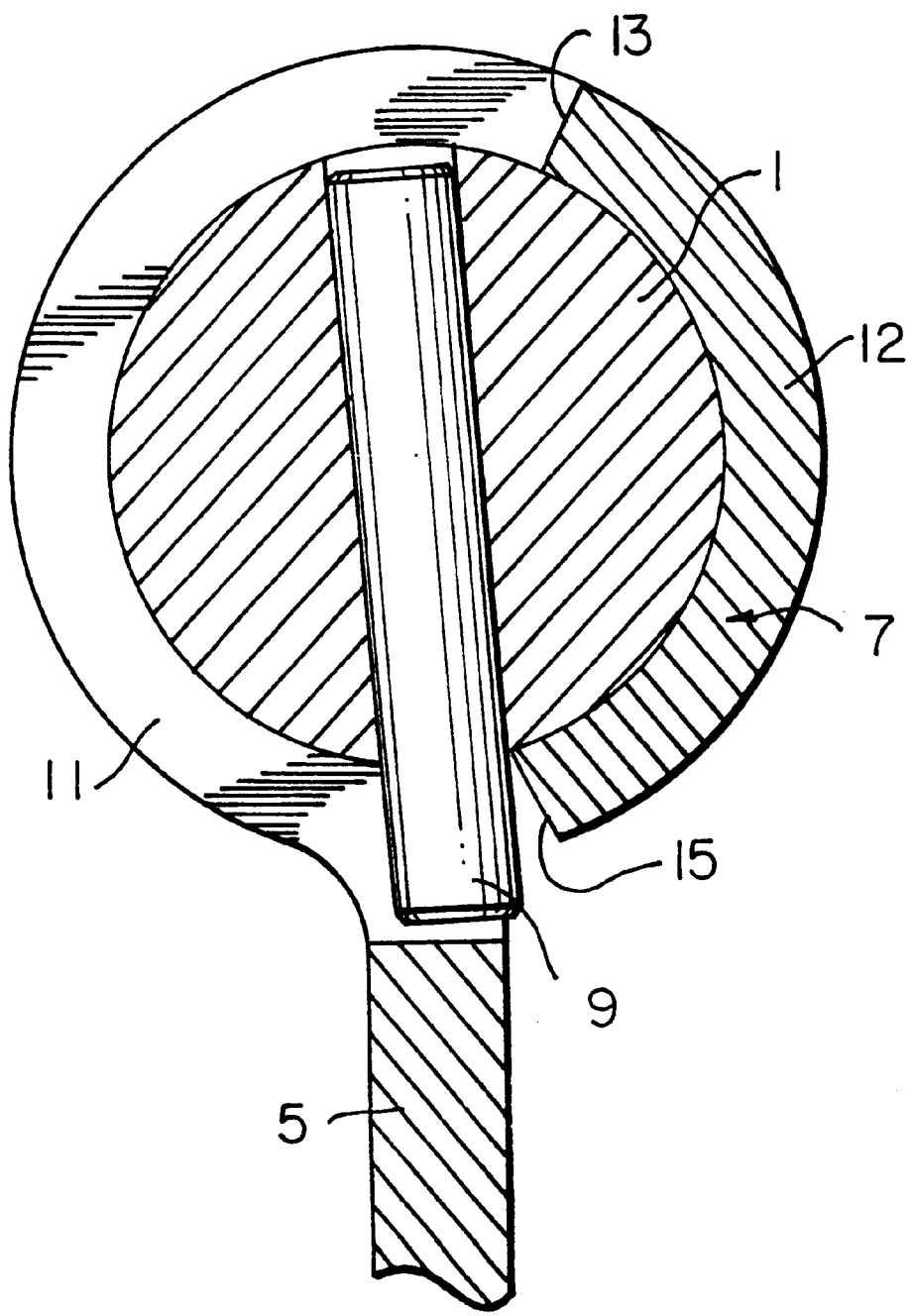
FIG. 3 is a partial cross-sectional view of the inventive hinge taken along line 3—3 in FIG. 1.

Shaft 1 of the inventive hinge also has pin 9 fixedly mounted perpendicular to its axis and protruding from only one side of the shaft. Prior to forming the shape of band 3, while the material is still in flat form, slot 11 of band 3, best seen in FIG. 1 and FIG. 3, is cut out so that the slot is developed partially in tail portion 5 and partially in circular portion 7. Slot 11 provides clearance for the protruding portion of pin 9 to pass through as the band and shaft are rotated with respect to one another.

Figure 4:
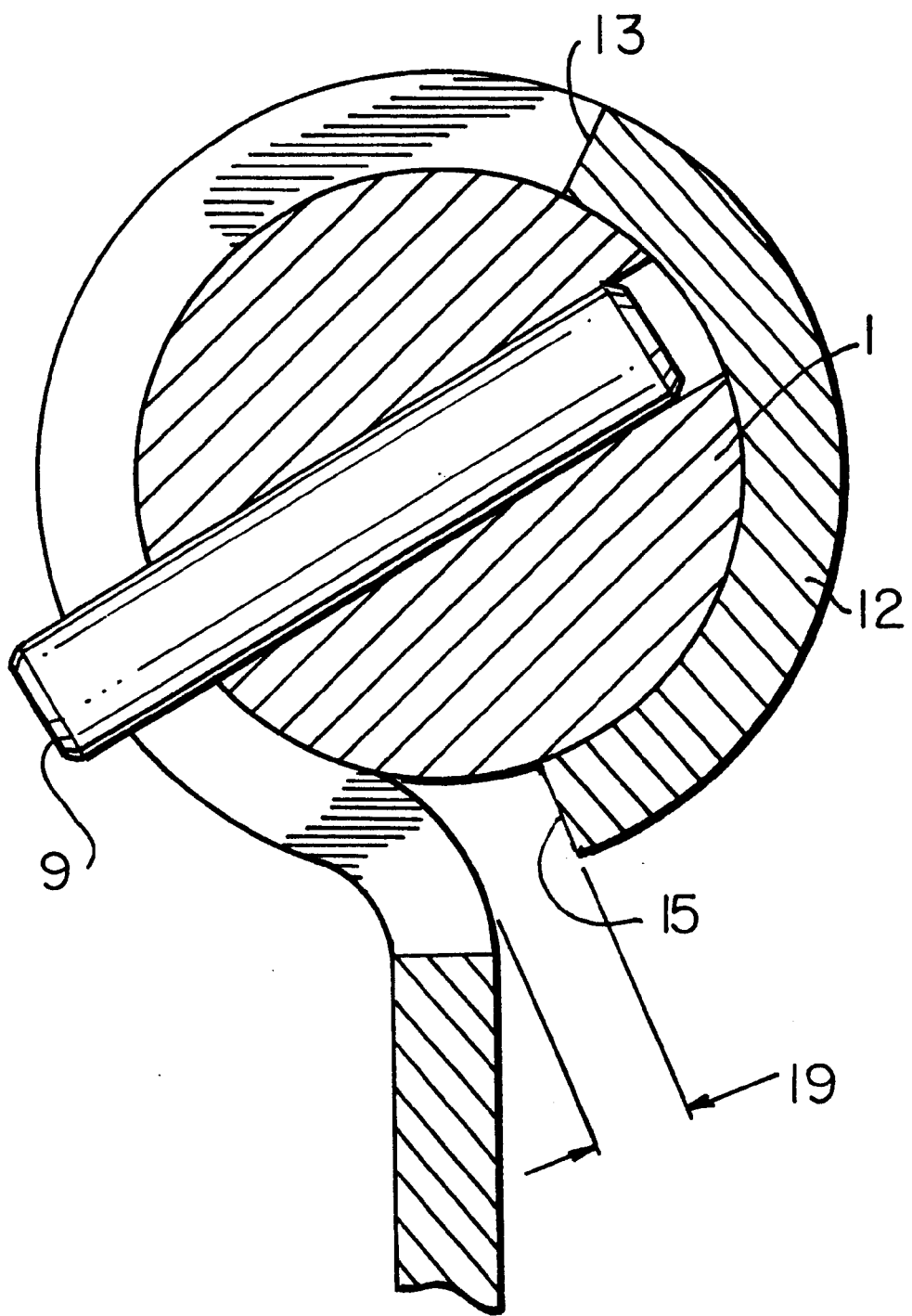
FIG. 4 is a partial cross-sectional view of the inventive hinge also taken through the line 3—3 in FIG. 1, but with the shaft partially rotated between fully closed and the fully opened positions.
Figure 5:
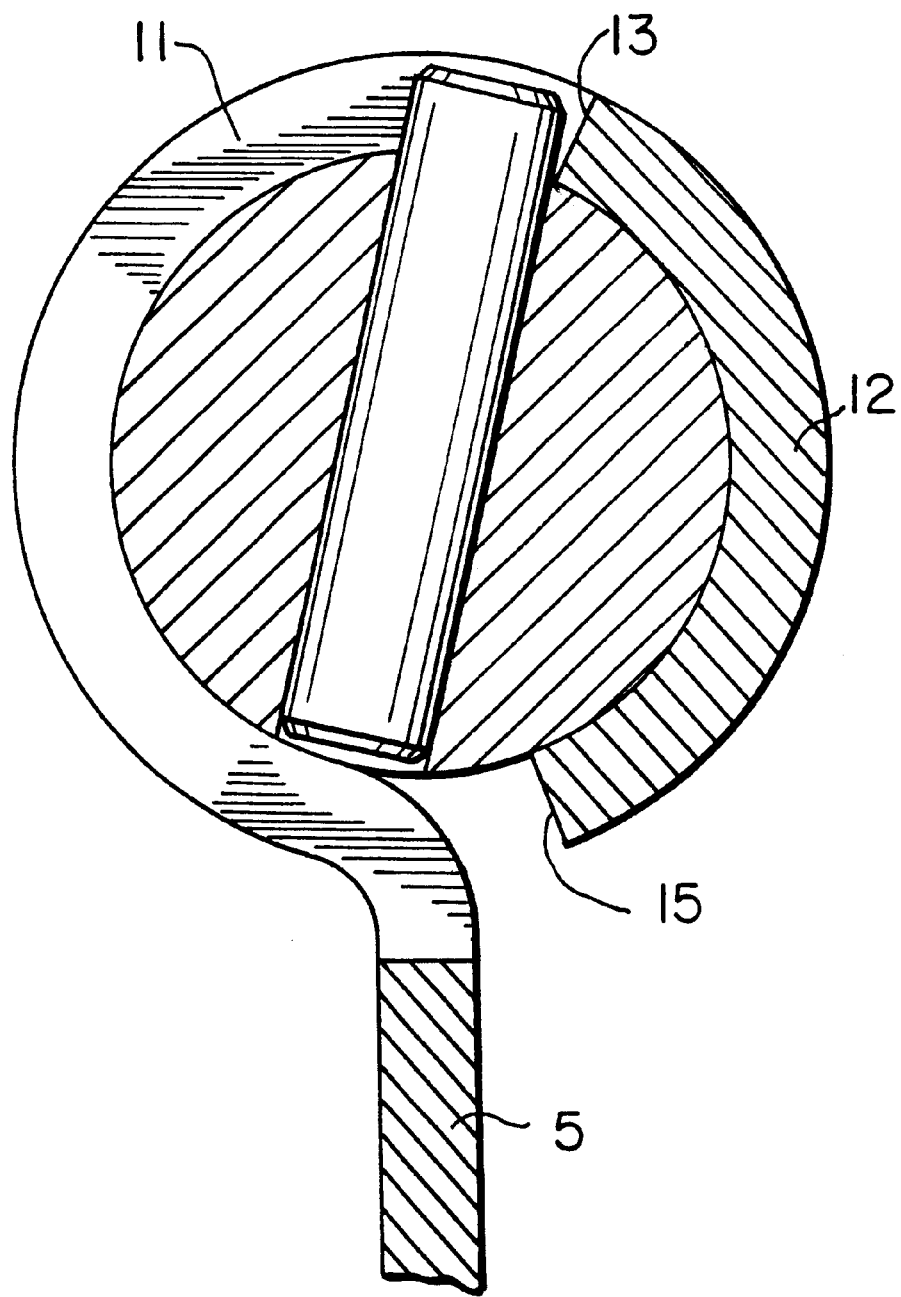
FIG. 5 is a partial cross-sectional view of the inventive hinge also taken along line 3—3 in FIG. 1, but with the shaft rotated to the fully opened position, bringing the pin into contact with the end of the slot in the band.
Figure 6:
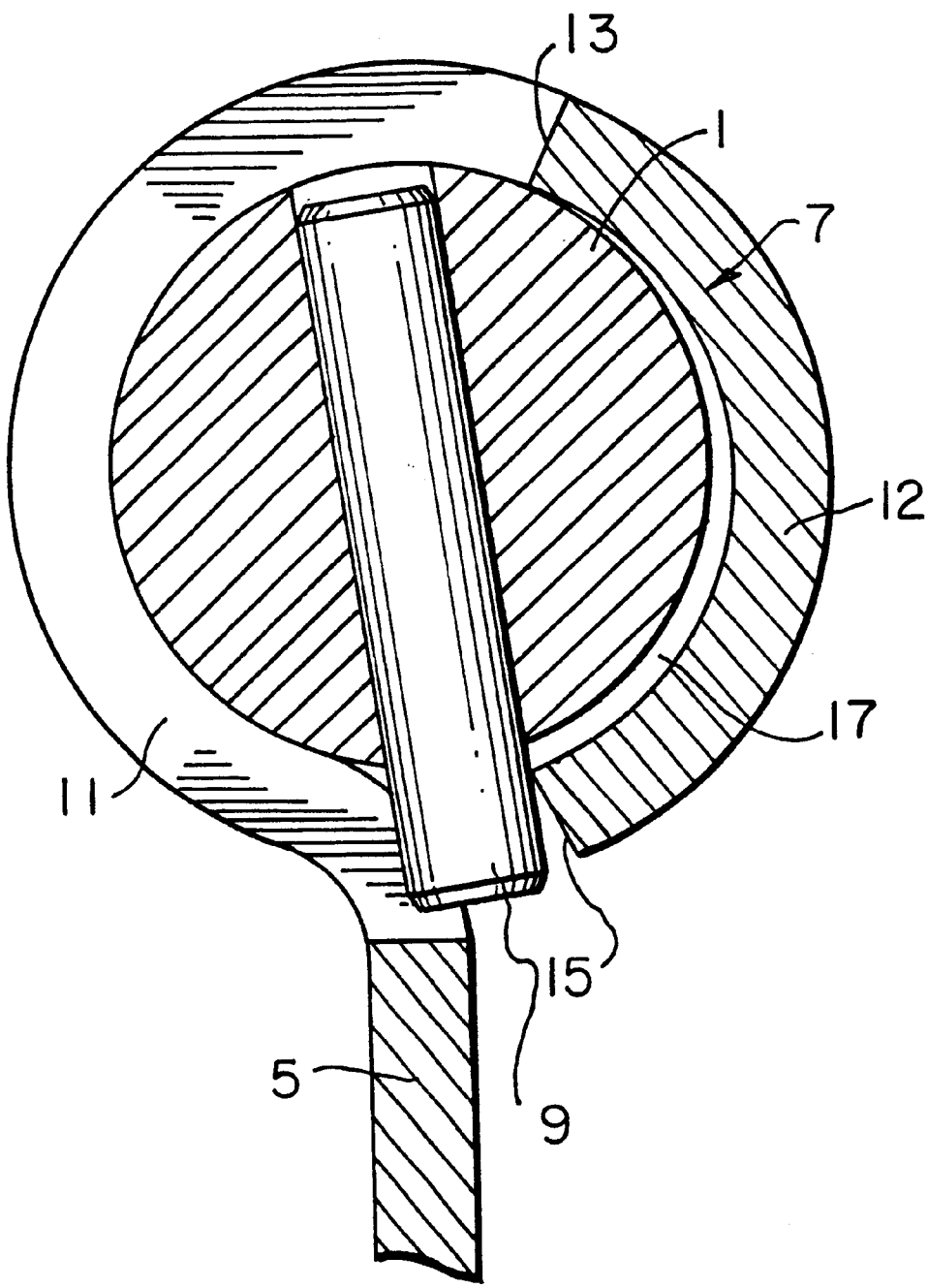
FIG. 6 is a partial cross-sectional view of the inventive hinge taken along line 3—3 in FIG. 1, but with the shaft rotated to the fully closed position, bringing the pin into contact with the end of the circular portion of the band and thereby slightly expanding the band.

Continued rotation in the opening direction brings pin 9 into contact with end 13 of slot 11, as seen in FIGS. 1, 4 and 5. As is well known in the prior art, the positioning of end 13 in relation to the angular orientation of pin 9 in shaft 1 can provide a convenient stop for limiting the backward rotation of the screen of a laptop computer or other similar device. Rotation in the opposite, closing direction, as shown in FIG. 6, brings pin 9 into contact with end 15 of circular portion 7 of band 3.

In the preferred embodiment of our invention, shaft 1 is mounted to the display portion of the device with an angular orientation that brings the initial contact between pin 9 and end 15 of the band just a few degrees before display reaches the fully closed position. Following the initial contact, continued movement of the display to reach full closure causes circular portion 7 of band 3 to expand slightly and produce clearance 17 as seen in FIG. 6. Band 3 is made of a spring material, and this expansion produces a spring force which tends to open the display slightly. Desirably, the device includes a latch mechanism to hold it shut despite this spring opening force.

Upon release of the latch mechanism, the opening movement of the display is helped by the fact that the frictional torque between the shaft and the band are greatly reduced by the slight opening of the band.

In the preferred embodiment of the invention, the axial positioning of shaft 1 within band 3 can be maintained by making gap 19, seen in FIG. 4, small enough so that pin 9 is still axially restrained by the sides of circular portion 7 which defines slot 11. Desirably, this means that gap 19, which increases slightly when the device is fully closed, as seen in FIG. 6, is small enough so that pin 9 remains half within slot 11. This mechanism of axial retention obviates the need for snap rings or other parts that, otherwise, would be required for that purpose.

Pop-up features and axial retention are features found in many present-day devices. However the pop-up feature usually is achieved by a mechanism separate from the friction hinge, therefore requiring additional parts, space and expense.

Figure 7A:
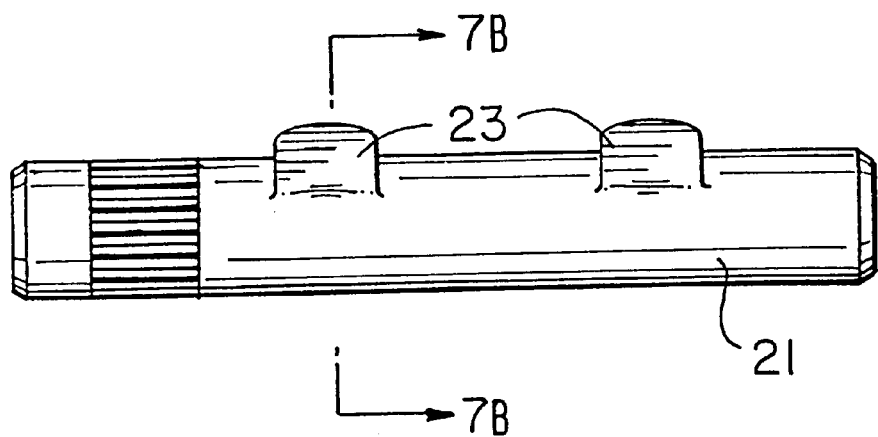
FIG. 7(*a*) is a side elevational view of the shaft of an alternative embodiment of the hinge of the invention.
Figure 7B:
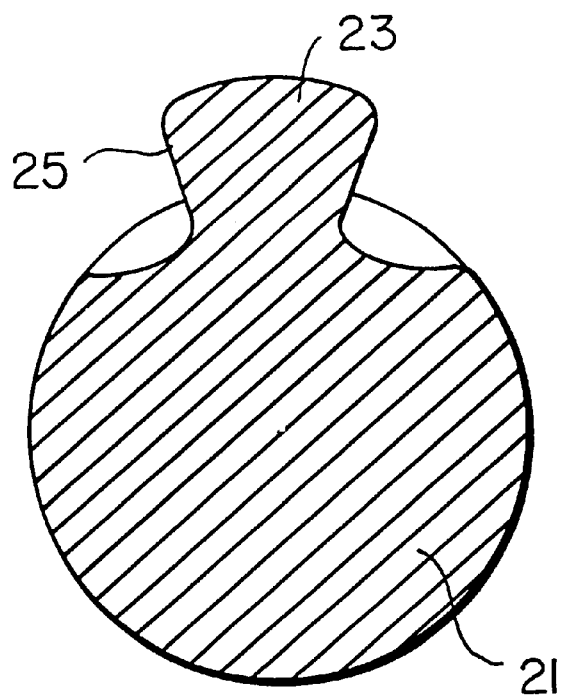

FIGS. 7(a) and 7(b) show an alternative arrangement for the shaft of our invention. Instead of a pin or pins anchored in the shaft of the hinge, shaft 21 is formed with one or more raised areas 23 being shaped to contact the end of the band in a hinge to cause the slight expansion necessary for the invention. Raised areas 23 should have surfaces 25 that are shaped for contacting and opening the band.

Figure 8:
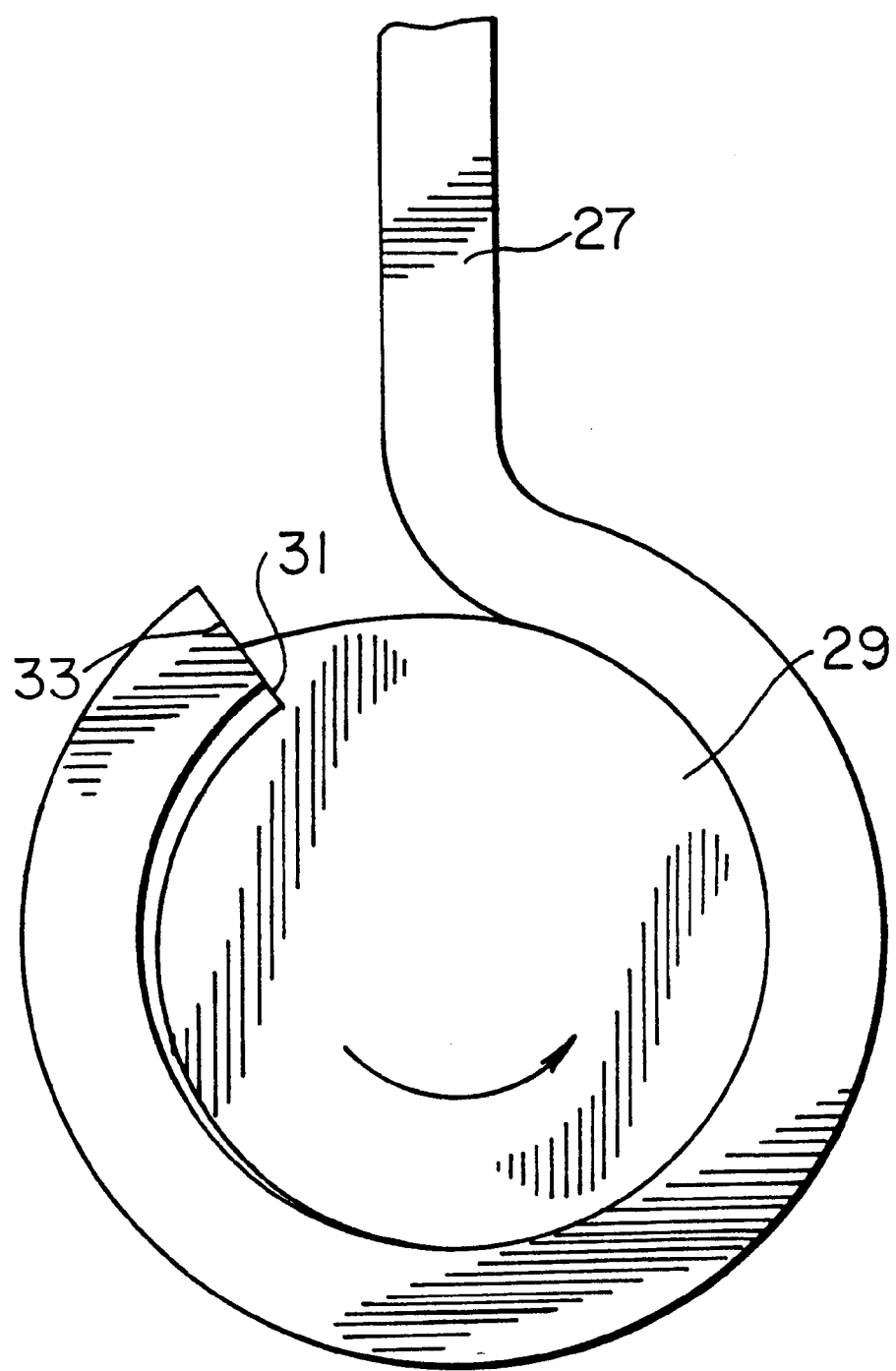
FIG. 8 is an end plan view of another embodiment of the hinge of the invention.

FIG. 8 depicts another shaft configuration that is capable of opening the band upon closure. Band 27 is similar in shape to band 3 of the preferred embodiment except that it is not formed with slot 11. Rather, shaft 29 has a cam shape with a cam surface 31 that, upon reaching closure of the device, contacts end 33 of band 27 to force it slightly open. The torque characteristics of the hinge of FIG. 8 are more complex than those of the preferred embodiment of FIGS. 1–6 because of the cam shape of the shaft as against the cylindrical shape of shaft 1 of the preferred embodiment. It is possible that the variations in torque caused by the cam shape can be used to advantage in some circumstances.

Figure 9:
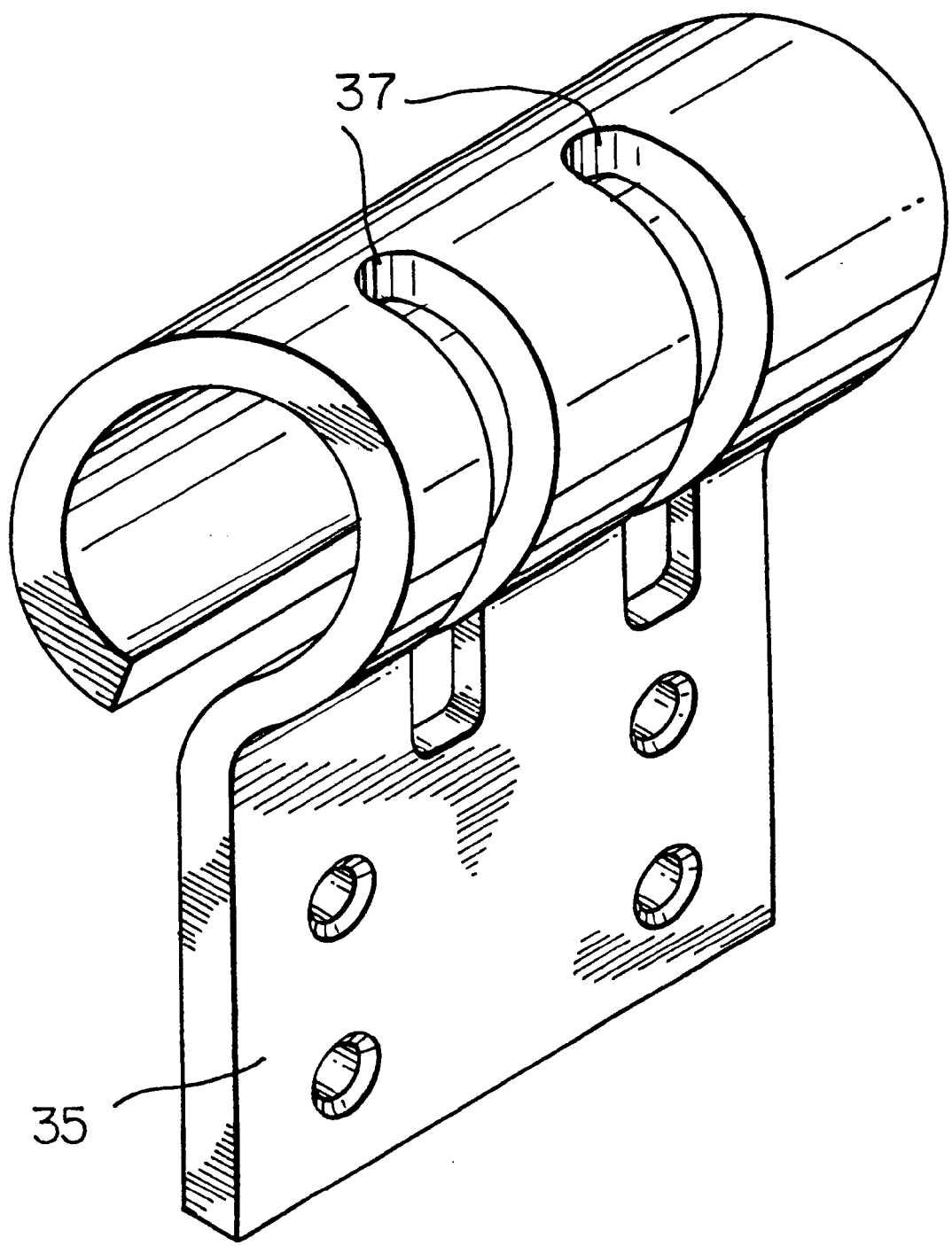
FIG. 9 is a perspective view of the band of a further alternative embodiment of the inventive hinge showing an arrangement for using more than one pin.

FIG. 9 shows band 35 having multiple slots 37 to accommodate more than one pin as was shown in the preferred embodiment of FIGS. 1–6.

Figure 10:
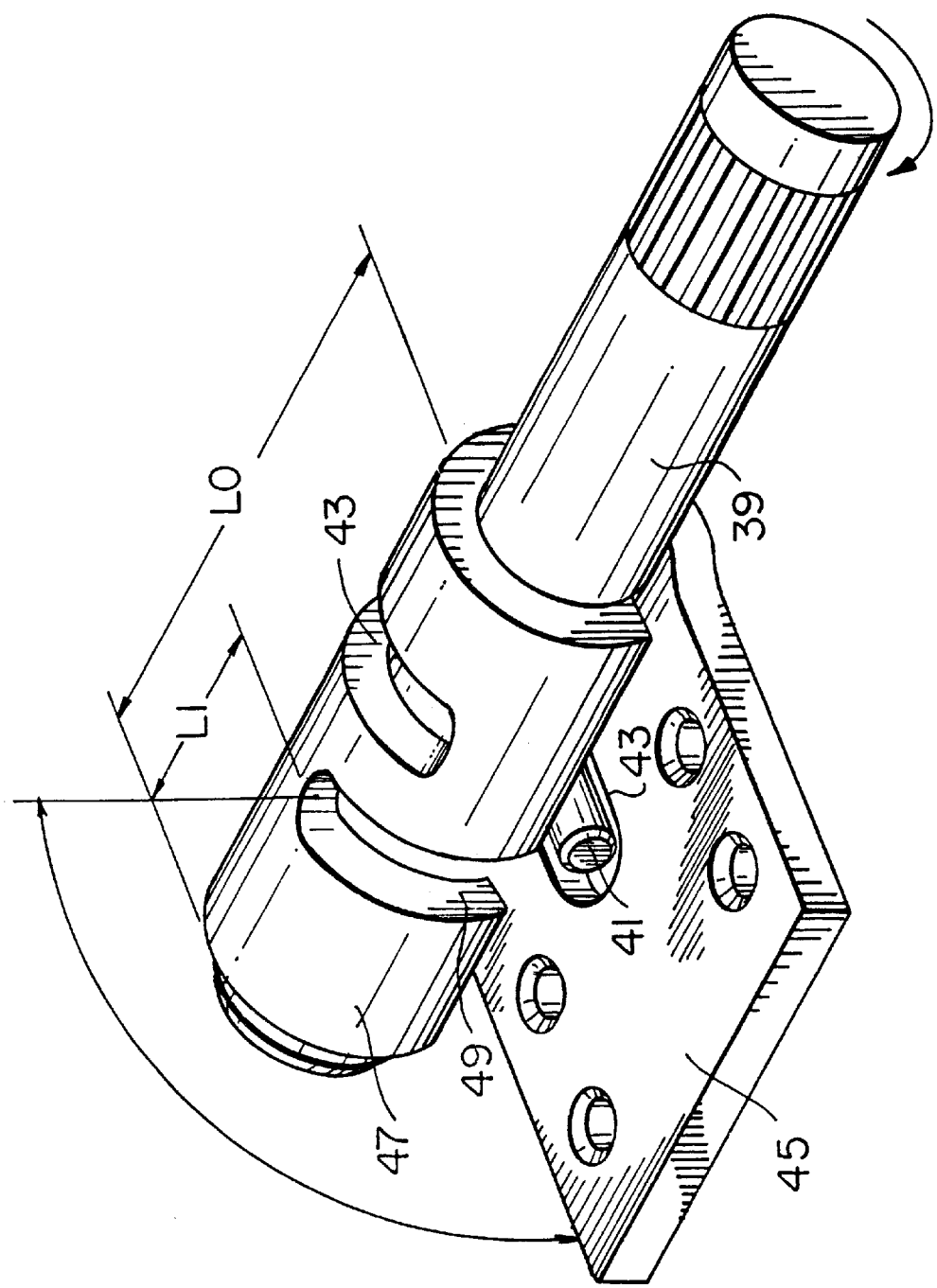
FIG. 10 is a perspective view of a hinge of the invention having the characteristics of the preferred embodiment together with a means for maintaining greater frictional torque during the movement to and from the fully closed position.

FIG. 10 depicts a hinge with two sections, one section having the characteristics of the invention, and another section having the characteristics of a friction hinge of the prior art. Shaft 39 has pin 41 which moves in slot 43 in band 45 as in the preferred embodiment. In this embodiment, band 45 also has extension 47 which wraps around shaft 39. But when pin 41 contacts the end of band 45, extension 47 is opened less than the rest of band 45 because it is partially separated from the rest the band by slot 49 which allows extension 47 to remain more tightly wrapped about shaft 39 than the portion of band 45 that comes into contact with pin 41.

The degree to which extension 47 acts independently of the rest of band 45 depends upon the arcuate extent of slot 49. The relative importance of the two sections can be controlled by adjusting L1 and L0, the relative axial lengths of the extension and the full band respectively.

Figure 11:
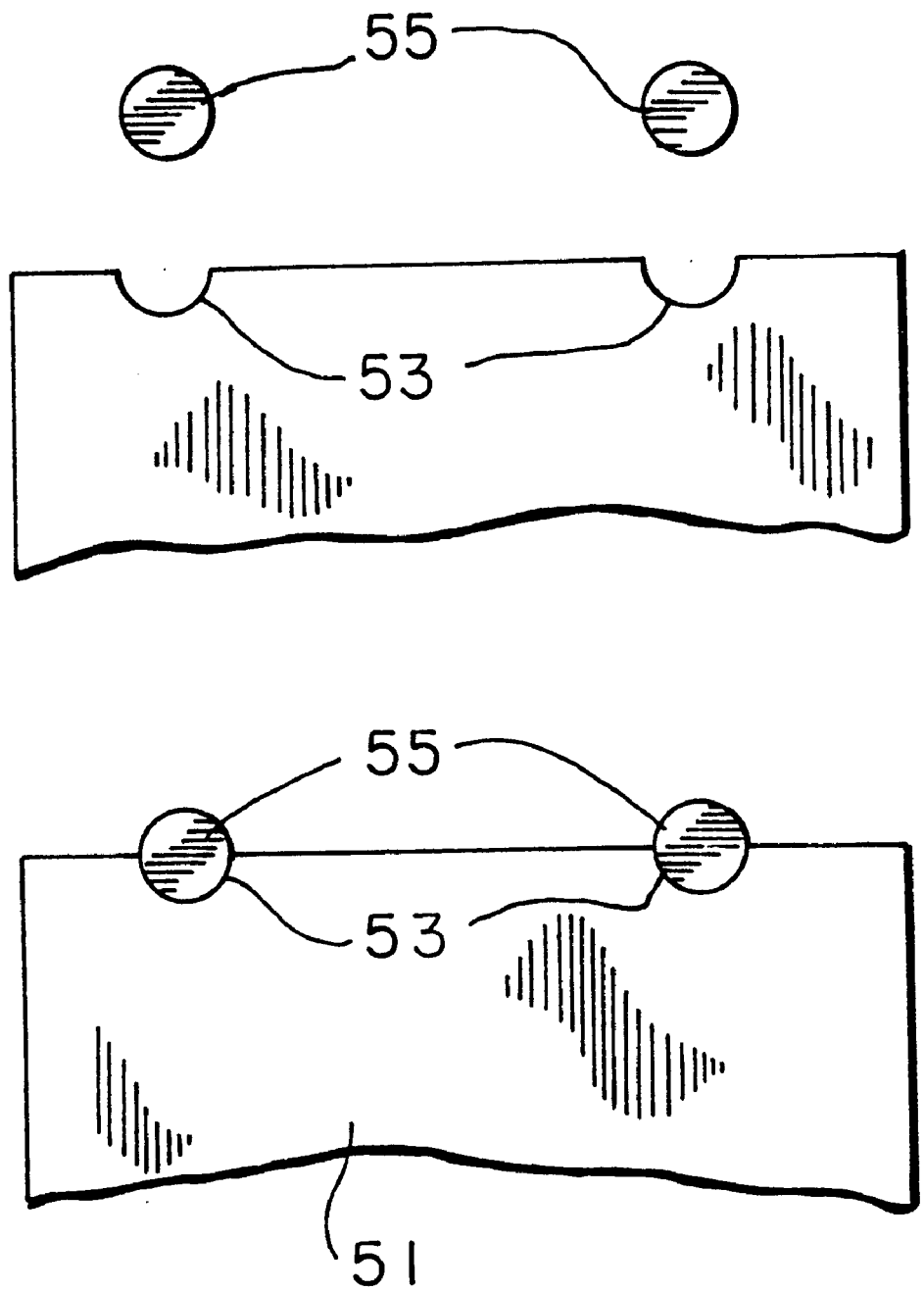
FIG. 11 shows an alternative configuration for the contact area between the pins and the end of the band.

FIG. 11 shows modifications to the ends of the band to provide greater surface area for contact with the pin or pins in the shaft of the hinge. Band 51 has semi-circular cutouts 53 in its end which are disposed for contacting pins 55. This avoids the problems arising from line contact with a cylindrical pin and the slightly irregular cut-off surface of a sheet metal part.

It will thus be seen that the objects set forth above, among those made apparent from the preceding description, are efficiently attained and, since certain changes may be made in the construction of the inventive pop-up friction hinge without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A friction hinge comprising:
    a shaft;
    a band including a spring portion having an end, said spring portion rotatable relative said shaft and wrapped tightly about said shaft for providing frictional torque between said shaft and said spring portion;
    a contact member fixedly mounted along said shaft such that said contact member engages said spring portion end when said spring portion is rotated in one of a first and second direction relative said shaft and reaches a selected rotational position with respect to said shaft;
    wherein said spring portion is capable of further rotation relative said shaft past said selected rotational position in said one of said first and second directions in order to cause said band spring portion to loosen about said shaft.

2. The friction hinge of claim 1, wherein said contact member comprises a pin extending outwardly from said shaft in one radial direction and substantially perpendicular to the axis thereof.

3. The friction hinge of claim 2, wherein said band is formed with a slot in which said extending pin is rotatably received.

4. The friction hinge of claim 2, wherein said end of said band spring portion is formed with a cut-out for receiving said pin upon engagement thereof.

5. The friction hinge of claim 1, wherein said contact member comprises at least one raised area formed along said shaft.

6. The friction hinge of claim 1, wherein said contact member comprises a caming surface formed along said shaft.

7. The friction hinge of claim 1, wherein said spring portion of said band includes a first section having said end selectively engageable by said contact member such that further rotation of said shaft causes said first section of said spring portion to loosen about said shaft, and a second section co-axial with said first section at least partially separated therefrom such that said second section in response to said further rotation of said shaft is loosened about said shaft to an extent less than said first section.

8. The friction hinge of claim 7, wherein said first section of said spring portion is separated from said second section of said spring portion by means of a slot formed in said spring portion of said band.

9. The friction hinge of claim 8, wherein said extent of said second section loosening about said shaft less than said first section is controllable by selective adjustment of the length of said slot.

10. The friction hinge of claim 7, wherein each of said first and second sections of said spring portion has a radial length and said extent of said second section of said spring portion loosening about said shaft less than said first section is controllable by selectable adjustment of at least one of said radial lengths.

11. A friction hinge comprising:
   a shaft rotatable in both first and second directions and thereby defining an axis of rotation;
   a band including a spring portion having an end, said spring portion wrapped about said shaft for providing frictional torque between said shaft and said spring portion of said band;
   a contact member fixedly mounted along said shaft such that said contact member engages said spring portion end when said shaft is rotated in one of said first and second directions in order to reach a selected rotational position with respect to said band spring portion;
   wherein said spring portion of said band includes a first section having said end selectively engageable by said contact member such that further rotation of said shaft causes said first section of said spring portion to loosen about said shaft, and a second section co-axial with said first section at least partially separated therefrom such that said second section in response to said further rotation of said shaft is loosened about said shaft to an extent less than said first section;
   wherein said first section of said spring portion is separated from said second section of said spring portion by means of a slot formed in said spring portion of said band.

12. The friction hinge of claim 11, wherein said extent of said second section loosening about said shaft less than said first section is controllable by selective adjustment of the length of said slot.

13. The friction hinge of claim 11, wherein said contact member comprises a pin extending outwardly from said shaft in one radial direction and substantially perpendicular to the axis thereof.

14. The friction hinge of claim 11, wherein said contact member comprises at least one raised area formed along said shaft.

15. The friction of claim 11, wherein said contact member comprises a caming surface formed along said shaft.

16. A friction hinge comprising:
   a shaft rotatable in both first and second directions and thereby defining an axis of rotation;
   a band including a spring portion having an end, said spring portion wrapped about said shaft for providing frictional torque between said shaft and said spring portion of said band;
   a contact member fixedly mounted along said shaft such that said contact member engages said spring portion end when said shaft is rotated in one of said first and second directions in order to reach a selected rotational position with respect to said band spring portion;
   wherein further rotation of said shaft in said one of said first and second directions causes said band spring portion to loosen about said shaft;
   wherein said spring portion of said band includes a first section having said end selectively engageable by said contact member such that further rotation of said shaft causes said first section of said spring portion to loosen about said shaft, and a second section co-axial with said first section at least partially separated therefrom such that said second section in response to said further rotation of said shaft is loosened about said shaft to an extent less than said first section;
   wherein each of said first and second sections of said spring portion has a radial length and said extent of said second section of said spring portion loosening about said shaft less than said first section is controllable by selectable adjustment of at least one of said radial lengths.

17. The friction hinge of claim 16, wherein said contact member comprises a pin extending outwardly from said shaft in one radial direction and substantially perpendicular to the axis thereof.

18. The friction hinge of claim 17, wherein said band is formed with a slot in which said extending pin is rotatably received.

19. The friction hinge of claim 17, wherein said end of said band spring portion is formed with a cut-out for receiving said pin upon engagement thereof.

20. A friction hinge comprising a shaft and a band including a spring portion rotatable relative to said shaft and wrapped about said shaft for providing frictional torque between said shaft and spring portion, said shaft including a member for engaging said spring portion when said spring portion is rotated in one of a first and second direction and reaches a selected rotational position with respect to said shaft, wherein said hinge is designed for further relative rotation of said shaft with respect to said band past said selected rotational position in said one of said first and second directions in order to cause said band spring portion to loosen elastically about said shaft.

* * * * *